Jan. 9, 1951  R. B. TURNER ET AL  2,537,381

POWER-DRIVEN UNLOADING APPARATUS FOR TRUCKS OR THE LIKE

Filed April 25, 1949

Inventors
Ralph B. Turner
and Henry W. Christgau,

By Mauro & Lewis

ATTORNEYS

Patented Jan. 9, 1951

2,537,381

UNITED STATES PATENT OFFICE 2,537,381

POWER-DRIVEN UNLOADING APPARATUS FOR TRUCKS OR THE LIKE

Ralph B. Turner and Henry W. Christgau, Grand Meadow, Minn.

Application April 25, 1949, Serial No. 89,506

4 Claims. (Cl. 214—83.34)

1

This invention relates to a new and novel unloading apparatus, especially adapted for use with vehicles such as trucks or wagons having a three sided enclosure, or having a removable wall such as a tail-gate. The invention will be found especially useful for farming purposes, where crops are customarily unloaded at a central location.

The invention makes use of known means for emptying the platform of a vehicle consisting of a flexible sheet, such as canvas, spread over the vehicle floor prior to loading, the sheet being tractable over the floor by means of a drum or roller to which the sheet is attached adjacent an opening in the side walls of the vehicle platform. The invention relates to improvements in apparatus for operating such a drum or roller.

A principal object of the invention is to provide power driven unloading apparatus which is portable and easily detachable from the vehicle, thus permitting the principal and expensive part of the unloading apparatus to be used with a plurality of vehicles.

A further object of the invention is to provide power driven unloading apparatus having simple and effective means for connecting with the vehicle and roller, avoiding the necessity for using conventional and time-consuming attaching means such as screws or clamps. The invention employs torque set up by operation of the unloader to provide a strong connection with the vehicle, and the mere turning off of the unloading device renders it in immediate condition for removal from the vehicle.

A further object is the provision of unloading means operable to unload a vehicle carrying a heavy load, by means of a motor element of extremely low horsepower, thus saving energy and weight in the device.

To illustrate the invention, the drawing shows the invention as adapted to unload a wagon open at the rear. It will be obvious, however, that the invention is applicable for the unloading of any platform, vehicular or stationary, over which a flexible sheet may be placed and adjacent to which a sheet roller or drum may be operated.

Further objects and advantages will be pointed out in connection with the description of the drawing, wherein.

Figure 1:
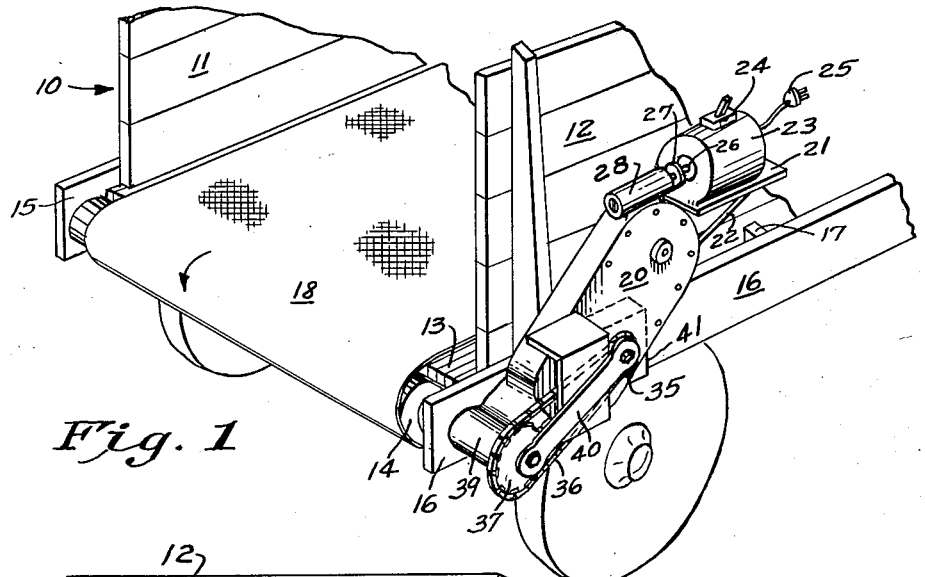
Fig. 1 is a perspective view showing the rear of a wagon with the unloading means of the invention in operable position.

In the figures, the rear of a wagon 10 is shown, having side walls 11 and 12 and a load supporting platform or floor 13. Parallel and adjacent to the rear edge of floor 13 a roller 14 is rotatably journalled in two support members 15 and 16 which for the sake of economy may simply consist of rectangular wooden beams attached lengthwise to the wagon sides and extending a slight distance rearwardly of the floor 13. The members 15 and 16 support roller 14 with its upper surface at approximately the same level as floor 13.

Since, according to the invention, the support 16 may be employed to support the roller driving means, support 16 should be attached to the vehicle by means of spacers, such as spacer blocks 17, Fig. 1, to allow a suitable clearance between support 16 and the vehicle wall 12.

A flexible elongated sheet 18 of canvas or the like, is provided in dimensions which when unrolled will cover the floor 13 with suitable clearance at the sides adjacent side walls 11 and 12. Sheet 18 at one end is secured to roller 14 by suitable fastening means (not shown) and is adapted to be rolled up on roller 14 in a counter-clockwise direction as viewed in the drawing. On the side to which the portable driving mechanism is to be attached, roller 14 is provided with a roller connecting socket 19, Fig. 3, which is substantially square in section.

The portable and detachable part of the unloading apparatus is characterized by a main gear housing 20 at one end of which is attached by suitable means (welding or the like) a motor platform 21 strengthened by a brace 22.

An electric motor 23 is shown in the figures, controlled by switch 24 and attachable to a convenient source of electric power (not shown) through a connecting cord and plug 25. The precise kind of motive power used to operate the invention is optional as long as portability is observed. In most cases an outside source of electric power is obtainable, for example, adjacent to buildings where vehicles are customarily unloaded. Other power means, however, such as a small gasoline motor, can be employed in place of the electric motor shown in the drawing, where electricity is not available.

Figure 2:
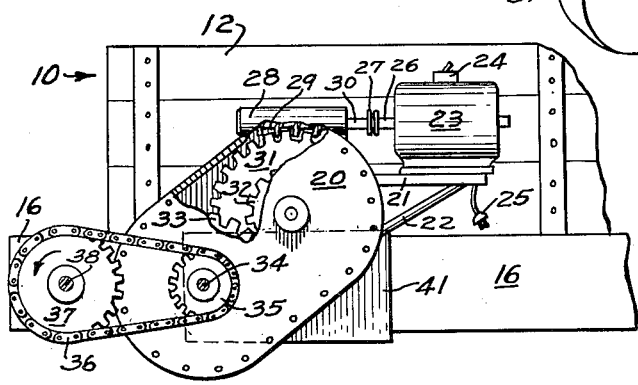
Fig. 2 is an elevation of the invention as attached to a wagon, with parts of the housing broken away to show reduction gears, and with the torque bar and chain guard omitted.

Motor 23 connects through motor shaft 26 and coupling 27 with the several stages of reduction gears. The upper part of housing 20 connects with a cylindrical housing in which is journalled a worm gear 29 connected with coupling 27 through worm gear shaft 30 (Fig. 2). Worm gear 29 connects with the uppermost of a series of reduction gears journalled in housing 20, these being gears 31, 32, and 33. Gear 33 is mounted on the shaft 34 which extends outside the housing 20 and rotatably supports sprocket 35.

Sprocket 35 is connected by a driving chain 36 to a relatively larger sprocket 37. Sprocket 37 is carried on the drive shaft 38 mounted in a bearing 39 attached to the lower end of the housing 20. The rigid spaced relationship of sprockets 35 and 37 is increased by providing a torque bar 40 (Fig. 1) mounted on the external ends of shafts 34 and 38. Drive shaft 38 is formed with a connecting pin 45, square in cross section (Fig. 3), and connects with socket 19 of roller 14 with a sliding fit. The driving means for roller 19 may thus simply be disconnected by laterally withdrawing the pin 39 from socket 19.

Figure 3:
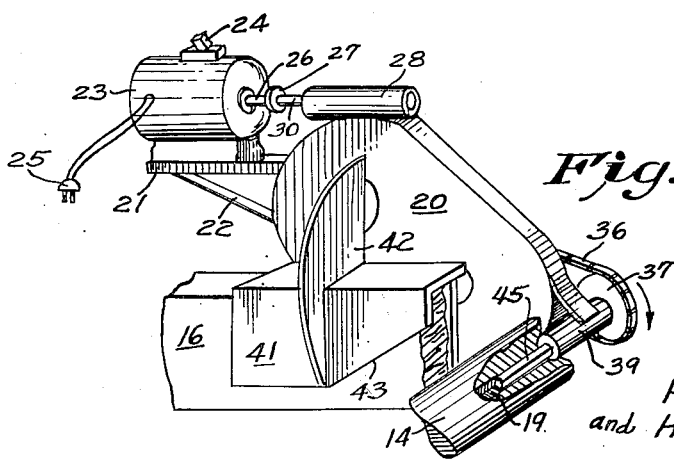
Fig. 3 is a perspective of the unloader from the side opposite to Fig. 2, with sheet roller and support partially shown.

To support the portable unloading means on the wagon, a bracket or saddle member 41 is connected to the inner side of housing 21 (by welding or the like), as best seen in Fig. 3. This bracket takes a shape complementary to the shape of support 16 having interior engaging walls in the shape of an inverted U. Bracket 41 is designed with sufficient tolerance in dimensions so that it may be slipped onto or lifted from support 16 without frictional resistance. An additional vertical brace 42 may be provided, and the inner edge of bracket 41 may be cut away, as at corner 43 to minimize the elevation of the machine when it is desired to remove same from support 16. It will be seen that, when attached to the wagon, bracket 41 supports the housing 21 with attached parts, at an angle tending to balance the weight toward the motor end of the assemblage.

The operation of the device is as follows:

Prior to loading, the canvas 18 is unrolled from roller 14 and stretched over floor 13, and the load placed in the vehicle 10 on top of canvas 18. The wagon is then driven to an unloading station adjacent an electrical outlet, in the case where the apparatus is employed with an electric motor. The portable driving means is attached by holding the device approximately vertically and causing pin 45 to enter socket 19 of the roller 14, then the device is lowered until bracket 41 rests snugly over support 16. When an electrical connection is made through socket 25, and switch 24 is closed, the driving means will cause canvas sheet 18 to wind up over roller 14, in the course of which operation the load is caused to travel rearwardly and over the open end of the wagon. Obviously the load may thus be dumped from the wagon into another receptacle, blower, or chute, or upon the ground.

When the motor driven unloading means is at rest, the portable part thereof will rest on the support 16, being prevented from any tendency to tip forward by the pin 45 engaged with socket 19, and being prevented from tipping sidewise by the snug fit between bracket 41 and support 16.

When the motor is started, and the parts rotate in the direction shown by arrows in the drawing, the work load caused by rolling up the canvas sheet 18 causes a reactionary force, or torque, to develop in the portable machinery operating the pin 45, which, according to the design, tends to force such machinery in a downward direction, i. e., clockwise in Figs. 1 and 2. This reaction to the work load merely seats bracket 41 the more firmly on support 16, with the result that the driving means cannot be dislodged from its support during operation. When the canvas 18 is completely rolled up, the load having then been dumped from the vehicle, the work load is relieved, and the motor may be switched off and the portable part of the invention removed from its support with facility.

Special merit attends the use of the four stages of gear reduction utilized in the device (elements 29, 31, 32, 35, 36, and 37 described above) which permit a reduction of about 750 to 1. By these means a motor of very low power, for example ¼ H. P., is sufficient to operate the canvas unloading means in trucks or vehicles carrying an average size load. By the arrangement according to the invention, the portable machinery elements are thus of ample strength to perform the required task, and yet of such light weight that the device can easily be attached, operated, and detached, by a single operator with a minimum amount of effort and waste of time in making the proper connections.

Having described the invention, what is claimed is:

1. Unloading apparatus of the type described, including a platform adapted to support a load a roller mounted adjacent said platform, a flexible sheet of sufficient size substantially to cover said platform, one edge of said sheet being connected to said roller, a coupling carried by one end of said roller for axial rotation thereof, said platform carrying a support member adjacent the end of said roller carrying the coupling, said support member being disposed on the side of the roller opposite to the direction of rotation thereof when the roller is rotated for unloading, and portable readily detachable driving apparatus for driving said roller comprising a frame supporting a motor, a drive coupling complementary to said roller coupling, and driving connections between said motor and said drive coupling, said frame being saddle shaped to rest over and slidingly embrace said support member carried by the platform, and said frame being held in engagement thereon by the torque reaction resulting from rotating the roller by the driving apparatus in unloading.

2. Unloading apparatus of the type described, including a platform adapted to support a load a roller mounted adjacent said platform, a flexible sheet of sufficient size substantially to cover said platform, one edge of said sheet being connected to said roller, a coupling carried by one end of said roller for axial rotation thereof, said platform carrying a supporting bar mounted longitudinally of the platform adjacent the end of said roller carrying the coupling, said support bar being disposed on the side of the roller opposite to the direction of rotation thereof when the roller is rotated for unloading, and portable readily detachable driving apparatus for driving said roller comprising a frame supporting a motor, a drive coupling complementary to said roller coupling, and driving connections between said motor and said drive coupling, said frame being formed with a hollow base formed to fit over and straddle said support bar for sliding engagement therewith when the motor is idle, said frame being pressed downwardly in engagement with said support bar by the torque action resulting from operation of the motor during the unloading operation.

3. The apparatus according to claim 2 wherein the support bar comprises a bar of rectangular cross section supported in spaced relation to said platform, and wherein said hollow base of the frame member is shaped in a form complementary to said bar.

4. Unloading apparatus of the type described, including a platform adapted to support a load, a roller mounted adjacent said platform, a flexible sheet of sufficient size substantially to cover said platform, one edge of said sheet being connected to said roller, a coupling carried by one end of said roller for axial rotation thereof, said platform carrying a support member adjacent the end of said roller carrying the coupling, said support member being disposed on the side of the roller opposite to the direction of rotation thereof when the roller is rotated for unloading, and portable readily detachable driving apparatus for driving said roller comprising a frame supporting a motor, a gear box, reduction gears in said gear box, driving connections between said gear box and motor and between said gear box and a drive coupling, said frame being shaped to form a saddle joint over said support member carried by the platform and held in engagement thereon by the torque reaction resulting from rotating the roller by the driving apparatus in unloading.

RALPH B. TURNER.
HENRY W. CHRISTGAU.

REFERENCES CITED

The following references are of record in the file of this patent:

UNITED STATES PATENTS

| Number | Name | Date |
| --- | --- | --- |
| 2,355,226 | Mallory | Aug. 8, 1944 |
| 2,448,122 | Recker | Aug. 31, 1948 |
| 2,488,217 | McCall | Nov. 15, 1949 |